United States Patent
Ha et al.

(10) Patent No.: US 9,175,196 B2
(45) Date of Patent: Nov. 3, 2015

(54) PHOTOCURABLE ADHESIVE COMPOSITION AND DISPLAY DEVICE COMPRISING SAME

(75) Inventors: Kyoung Jin Ha, Uiwang-si (KR); Ji Hye Kwon, Uiwang-si (KR); Lee June Kim, Uiwang-si (KR); Irina Nam, Uiwang-si (KR); Se Il Oh, Uiwang-si (KR); Seung Jib Choi, Uiwang-si (KR)

(73) Assignee: CHEIL INDUSTRIES, INC., Gumi-si, Gyeongsangbuk-do (KR)

( * ) Notice: Subject to any disclaimer, the term of this patent is extended or adjusted under 35 U.S.C. 154(b) by 0 days.

(21) Appl. No.: 14/362,502

(22) PCT Filed: Aug. 6, 2012

(86) PCT No.: PCT/KR2012/006225
§ 371 (c)(1),
(2), (4) Date: Jun. 3, 2014

(87) PCT Pub. No.: WO2013/085132
PCT Pub. Date: Jun. 13, 2013

(65) Prior Publication Data
US 2014/0329927 A1    Nov. 6, 2014

(30) Foreign Application Priority Data

Dec. 7, 2011  (KR) .......................... 10-2011-0130570
Dec. 7, 2011  (KR) .......................... 10-2011-0130572

(51) Int. Cl.
| | |
|---|---|
| C08F 2/46 | (2006.01) |
| C08F 2/50 | (2006.01) |
| B29C 71/04 | (2006.01) |
| C08G 61/04 | (2006.01) |
| C09J 147/00 | (2006.01) |
| C09J 133/06 | (2006.01) |
| C09J 175/00 | (2006.01) |
| C09J 175/16 | (2006.01) |
| C09J 4/00 | (2006.01) |
| C09J 133/14 | (2006.01) |
| C09J 4/06 | (2006.01) |
| C08F 2/48 | (2006.01) |

(52) U.S. Cl.
CPC ................. *C09J 147/00* (2013.01); *C08F 2/48* (2013.01); *C09J 4/00* (2013.01); *C09J 4/06* (2013.01); *C09J 133/066* (2013.01); *C09J 133/14* (2013.01); *C09J 175/00* (2013.01); *C09J 175/16* (2013.01); *G02F 2201/503* (2013.01); *G02F 2201/54* (2013.01); *G02F 2202/023* (2013.01); *G02F 2202/28* (2013.01)

(58) Field of Classification Search
USPC ............. 522/42, 33, 6, 1, 71, 189, 184; 520/1
See application file for complete search history.

(56) References Cited

U.S. PATENT DOCUMENTS

| | | | | |
|---|---|---|---|---|
| 2007/0179254 | A1* | 8/2007 | Wang et al. .................... | 525/440 |
| 2008/0271912 | A1* | 11/2008 | Yoshida et al. ............... | 174/250 |
| 2012/0250268 | A1* | 10/2012 | Ito et al. ........................ | 361/748 |

FOREIGN PATENT DOCUMENTS

| | | |
|---|---|---|
| JP | 02-909661 B2 | 6/1999 |
| JP | 03-019294 B2 | 3/2000 |
| JP | 2002-069138 A | 3/2002 |
| JP | 03-808737 B2 | 8/2006 |
| KR | 10-2010-0014583 A | 2/2010 |
| KR | 10-2011-073457 A | 6/2011 |
| WO | WO 2005/090509 A1 | 9/2005 |
| WO | 2011-074528 * | 6/2011 |

OTHER PUBLICATIONS

Office Action mailed Apr. 23, 2014 in corresponding Korean Patent Application No. 10-2011-0130570.
Office Action mailed Apr. 23, 2014 in corresponding Korean Patent Application No. 10-2011-0130572.

* cited by examiner

*Primary Examiner* — Ling Choi
*Assistant Examiner* — Jessica E Whiteley
(74) *Attorney, Agent, or Firm* — Lee & Morse, P.C.

(57) ABSTRACT

The present invention relates to a photocurable adhesive composition. The photocurable adhesive composition comprises a urethane(meth)acrylate resin, a functional-group-containing polybutadiene, a photocurable monomer and a photoinitiator; and the functional group is either an epoxy group or a hydroxyl group. The photocurable adhesive composition ensures good outdoor readability, has outstanding adhesive properties, and impact strength and optical transparency, and minimizes the phenomenon whereby substantial contraction occurs during photocuring, and thus can be suitably used for a display.

23 Claims, No Drawings

PHOTOCURABLE ADHESIVE COMPOSITION AND DISPLAY DEVICE COMPRISING SAME

TECHNICAL FIELD

The present invention relates to a photocurable adhesive composition and a display including the same. More particularly, the present invention relates to a photocurable adhesive composition, which includes a specific binder to improve outdoor visibility and contraction rate while ensuring good properties in terms of adhesion, optical transmittance and impact resistance, and a display including the same.

BACKGROUND ART

In general, mobile displays can be classified into displays for mobiles, and displays for TVs and monitors. For such display panels, it is an important issue to improve outdoor visibility and impact strength so as to correspond to increase in panel size. In this regard, optical adhesive films serve to improve outdoor visibility and impact resistance.

A display panel includes a glass window layer as an outermost layer, an air layer placed under the window layer, and an ITO glass placed under the air layer. The air layer is filled with a transparent material having a similar index of refraction to that of the window glass to improve outdoor visibility.

Currently, materials used as optical adhesives are classified into liquid type and film type materials. Despite the use convenience, film type materials have difficulty in application to various structures and removal of bubbles created upon attachment to a substrate. Moreover, since the film type material has high internal cohesion and thus does not allow easy removal, the film type material has undesirable reworkability and is produced through a complicated process causing increase in manufacturing costs.

Accordingly, development of inexpensive liquid phase materials allowing easy removal of bubbles is a recent trend in the art. Such a liquid phase material is formed into a film through photocuring. A liquid type adhesive is formed into a film through a process of filling a matrix with the liquid type adhesive, followed by photocuring of the liquid type adhesive. Although such a liquid type adhesive allows easy removal of bubbles, there is a problem of high contraction rate upon photocuring. In addition, a typical liquid phase adhesive composition has a high acid value of less than pH 4, thereby causing substrate corrosion.

Further, with the recent trend of increasing the size of mobile displays, a photocurable material is often separated from an upper material, such as glass, polycarbonate or polymethyl methacrylate, due to deterioration in adhesion therebetween by contraction upon photocuring. Particularly, isoprene or butadiene resins used as rubber materials applicable to displays have a limitation in enhancement of adhesion after photocuring. Moreover, with increasing sizes of display products, there is a need for a material having lower viscosity than that of typical materials in order to allow more efficient dispensing of liquid materials.

DISCLOSURE

Technical Problem

It is an aspect of the present invention to provide a photocurable adhesive composition, which secures good outdoor visibility and has a pH of about 4 or higher to minimize corrosion of a substrate, and a display including the same.

It is another aspect of the present invention to provide a photocurable adhesive composition, which has improved impact resistance corresponding to enlargement of panels, and a display including the same.

It is a further aspect of the present invention to provide a photocurable adhesive composition, which minimizes contraction upon photocuring and has high elongation, and a display including the same.

It is yet another aspect of the present invention to provide a photocurable adhesive composition, which exhibits excellent light transmittance and excellent adhesion, and a display including the same.

It is yet another aspect of the present invention to provide a photocurable adhesive composition, which exhibits excellent properties in terms of adhesion, tensile strength, impact strength, index of refraction, post-curing appearance, and wettability, and a display including the same.

Technical Solution

One aspect of the present invention relates to a photocurable adhesive composition. In one embodiment, the photocurable adhesive composition includes a urethane(meth)acrylate resin, a functional group-containing polybutadiene, a photocurable monomer, and a photoinitiator, wherein the functional group is an epoxy group or a hydroxyl group.

In another embodiment, the photocurable adhesive composition may include a urethane(meth)acrylate resin and a functional group-containing polybutadiene, wherein the functional group is an epoxy group or a hydroxyl group, and the photocurable adhesive composition has a pH of about 4 or higher.

In a further embodiment, the photocurable adhesive composition may include a urethane(meth)acrylate resin and a functional group-containing polybutadiene, wherein the functional group is an epoxy group or a hydroxyl group, and the photocurable adhesive composition has a curing contraction rate of about 3.5% or less and an elongation of about 200% to about 800% in accordance with ASTM D638.

In the adhesive composition, the urethane(meth)acrylate resin and the functional group-containing polybutadiene may be present in an amount of about 50 wt % to about 80 wt %.

The urethane(meth)acrylate resin and the functional group-containing polybutadiene may include terminal vinyl groups.

The photocurable adhesive composition may include about 25 wt % to about 76 wt % of the urethane(meth)acrylate resin, about 2.5 to about 40 wt % of the functional group-containing polybutadiene, about 15 wt % to about 40 wt % of the photocurable monomer, and about 1 wt % to about 5 wt % of the photoinitiator.

The urethane(meth)acrylate resin and the functional group-containing polybutadiene may be present in a weight ratio of about 1:1 to about 20:1.

The urethane(meth)acrylate resin may have a weight average molecular weight of about 3,000 g/mol to about 25,000 g/mol, and a polydispersity index of about 1 to about 3.

The urethane(meth)acrylate resin may have a glass transition temperature of about −65° C. to about −55° C., and a viscosity at 25° C. of about 5,000 cPs to about 45,000 cPs.

The photocurable adhesive composition may have a storage modulus of about 10 kPa to about 100 kPa.

In one embodiment, the functional group-containing polybutadiene may be an epoxy group-containing polybutadiene.

The epoxy group-containing polybutadiene may have a number average molecular weight of about 3,000 g/mol to about 20,000 g/mol, and a viscosity at 45° C. of about 20,000 cPs to about 120.000 cPs.

The epoxy group-containing polybutadiene may have an epoxy equivalent weight of about 100 g/eq. to about 500 g/eq.

The epoxy group-containing polybutadiene may have a glass transition temperature of about −70° C. to about −30° C.

The epoxy group-containing polybutadiene may have a repeat unit represented by Formula 1-1 to Formula 1-4:

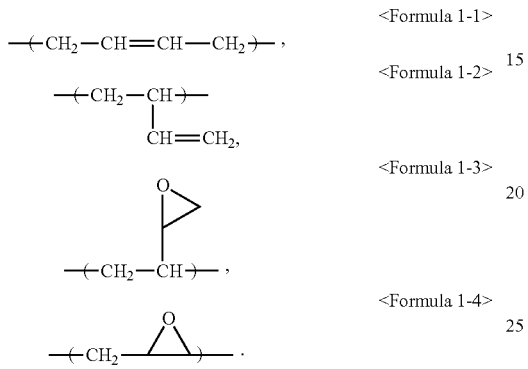

<Formula 1-1>
<Formula 1-2>
<Formula 1-3>
<Formula 1-4>

In another embodiment, the functional group-containing polybutadiene may be a hydroxyl group-containing polybutadiene.

The hydroxyl group-containing polybutadiene may have a weight average molecular weight of about 1,500 g/mol to about 10,000 g/mol, and a polydispersity index of about 1.2 to about 2.7.

The hydroxyl group-containing polybutadiene may have a hydroxy value of about 0.7 meq/g to about 1.9 meq/g and a butadiene group content of 70% or more.

The hydroxyl group-containing polybutadiene may have a glass transition temperature of about −80° C. to about −70° C.

The hydroxyl group-containing polybutadiene may have a structure represented by Formula 2:

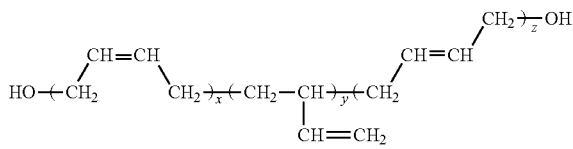

(where x ranges from about 0.1 to about 0.35, y ranges from about 0.1 to about 0.35, and z ranges from about 0.4 to about 0.7).

The photocurable monomer may include at least one selected from the group consisting of a hydroxyl group-containing (meth)acrylate, a monocyclic or heterocyclic aliphatic ring-containing (meth)acrylate, a (meth)acrylic monomer having a monocyclic aliphatic hetero-ring including nitrogen, oxygen or sulfur, a carboxyl group-containing (meth)acrylic monomer, and a vinyl group and silane group-containing monomer.

The photocurable adhesive composition may further include additives, such as silane coupling agents, UV absorbents, and heat stabilizers, and the like. Here, at least one additive may be used.

Another aspect of the present invention relates to a display including the photocurable adhesive composition.

Advantageous Effects

The present invention provides a photocurable adhesive composition, which secures good outdoor visibility, has a pH of about 4 or higher to minimize substrate corrosion, has improved impact resistance corresponding to enlargement of panels, minimizes contraction upon photocuring and has high elongation, exhibits excellent properties in terms of light transmittance, tensile strength, impact strength, index of refraction, post-curing appearance, and wettability. The present invention also provides a display including the same.

BEST MODE

Unless otherwise stated, the term "(meth)acryl" means both "(meth)acryl" and "acryl".

As used herein, the term "substituted" means that at least one hydrogen atom in a compound is substituted with a halogen atom (F, Cl, Br or I), a hydroxyl group, a nitro group, a cyano group, an amino group, an azido group, an amidino group, a hydrazino group, a hydrazono group, a carbonyl group, a carbamyl group, a thiol group, an ester group, a carboxyl group or salts thereof, a sulfonic acid group or salts thereof, a phosphoric acid group or salts thereof, a $C_1$ to $C_{20}$ alkyl group, a $C_2$ to $C_{20}$ alkenyl group, a $C_2$ to $C_{20}$ alkynyl group, a $C_1$ to $C_{20}$ alkoxy group, a $C_6$ to $C_{30}$ aryl group, a $C_6$ to $C_{30}$ aryloxy group, a $C_3$ to $C_{30}$ cycloalkenyl group, a $C_3$ to $C_{30}$ cycloalkynyl group, or combinations thereof.

The photocurable adhesive composition according to the invention includes a urethane(meth)acrylate resin, a functional group-containing polybutadiene, a photocurable monomer, and a photoinitiator, wherein the functional group may be an epoxy group or a hydroxyl group.

According to a first embodiment, a photocurable adhesive composition includes a urethane(meth)acrylate resin, an epoxy group-containing polybutadiene, a photocurable monomer, and a photoinitiator.

According to a second embodiment, a photocurable adhesive composition includes a urethane(meth)acrylate resin, a hydroxyl group-containing polybutadiene, a photocurable monomer, and a photoinitiator.

Hereinafter, each component of the photocurable adhesive composition will be described in more detail.

(A) Urethane (Meth)Acrylate Resin

According to the present invention, the urethane(meth)acrylate resin includes a terminal vinyl group. Since the urethane(meth)acrylate resin includes the terminal vinyl group, the urethane(meth)acrylate resin promotes curing, thereby providing good storage modulus. In some embodiments, the vinyl group may be present in an amount of about 0.5 mol % to about 4 mol %, preferably about 0.5 mol % to about 1.5 mol % in the urethane(meth)acrylate resin. Within this content range of the vinyl group, the adhesive composition can provide excellent adhesion while allowing reduction in aging time.

In one embodiment, the urethane(meth)acrylate resin may be a copolymer prepared through copolymerization of a urethane polyol; and a (meth)acrylic monomer having an isocyanate group and a terminal vinyl group. The urethane polyol may be a copolymer of a polyol and an isocyanate compound.

For example, the urethane(meth)acrylate resin may be a copolymer prepared by forming the urethane polyol through polymerization of the polyol and the isocyanate compound, followed by polymerization of the (meth)acrylic monomer having an isocyanate group and a vinyl group. In some embodiments, the polyol, the isocyanate compound, and the (meth)acrylic monomer having an isocyanate group and a vinyl group may be polymerized in an equivalent weight ratio of about 1:0.75 to about 0.85:0.15 to about 0.25. Within this range, the urethane(meth)acrylate resin exhibits high elongation, low tensile strength, and low curing contraction, which are main properties of a urethane binder.

The polyol may include at least one selected from the group consisting of ethylene glycol, polyethylene glycol, propylene glycol, polypropylene glycol, polytetramethylene glycol, tetramethylene glycol, 1,3-butanediol, 1,4-butanediol, 1,6-hexanediol, neopentyl glycol, polycarbonate polyol, polyester polyol, and 1,4-cyclohexanedimethanol, without being limited thereto.

The isocyanate compound may be a compound having at least two isocyanate groups. The diisocyanate compound may include at least one selected from the group consisting of isoprene, hexamethylene and toluene compounds, without being limited thereto. For example, the diisocyanate compound may include at least one selected from the group consisting of toluene diisocyanate, diphenylmethane diisocyanate, isophorone diisocyanate, hexamethylene diisocyanate, xylene diisocyanate, hydrogenated diphenylmethane diisocyanate, naphthalene diisocyanate, and 2,4-toluene diisocyanate. Alternatively, the diisocyanate compound may include at least one selected from the group consisting of biuret type, isocyanurate type, adduct type, and bifunctional prepolymer type diisocyanate compounds, without being limited thereto.

In other embodiments, the urethane(meth)acrylate resin may be prepared through polymerization of a monomer mixture including an isocyanate group-containing (meth)acrylate and a hydroxyl group-containing (meth)acrylate.

Examples of the isocyanate group-containing (meth)acrylate may include 2-isocyanatoethyl methacrylate, 2-isocyanatoethyl acrylate, 2-isocyanatopropyl acrylate, 2-(O-[1'-methylpropylideneamino]carboxyamino)ethyl methacrylate, 2-isocyanatoethyl 2-propenoate, 1,1-bis(acryloyloxy methyl ethyl isocyanate), and the like. These may be used alone or in combination thereof. Preferably, 2-isocyanatoethyl methacrylate, 2-isocyanatoethyl acrylate, and the like may be used as the isocyanate group-containing (meth)acrylate. The isocyanate group-containing (meth)acrylate may be present in an amount of about 1 wt % to about 35 wt % based on the total amount of the monomers. Preferably, the isocyanate group-containing (meth)acrylate is present in an amount of about 2 wt % to about 5 wt %. Within this range, the adhesive composition can maintain adhesion at a predetermined degree or more even after photocuring and can increase internal cohesion of an adhesive film, thereby improving storage modulus.

Examples of the hydroxyl group-containing (meth)acrylate may include 2-hydroxyethyl(meth)acrylate, 4-hydroxybutyl(meth)acrylate, 2-hydroxypropyl(meth)acrylate, 2-hydroxybutyl(meth)acrylate, 6-hydroxyhexyl(meth)acrylate, 1,4-cyclohexanedimethanol mono(meth)acrylate, chloro-2-hydroxypropyl acrylate, diethylene glycol mono(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth)acrylate, 2-hydroxypropyl(meth)acrylate, 2-hydroxybutyl(meth)acrylate, 2-hydroxy-3-phenyloxypropyl(meth)acrylate, 4-hydroxycyclohexyl(meth)acrylate, 2-hydroxyethylacrylamide, cyclohexanedimethanol monoacrylate, and the like. These may be used alone or in combination thereof. In addition, the hydroxyl group-containing (meth)acrylate may include glycidyl group-containing compounds, such as alkyl glycidyl ether, aryl glycidyl ether, glycidyl(meth)acrylate, and the like, adduct compounds obtained through additive reaction with (meth)acrylic acid, and the like. Among these compounds, the hydroxyl group-containing (meth)acrylate preferably includes 2-hydroxyethyl(meth)acrylate, 4-hydroxybutyl(meth)acrylate, 2-hydroxyethylacrylamide or cyclohexane dimethanol monoacrylate, more preferably 2-hydroxyethyl(meth)acrylate, 4-hydroxybutyl(meth)acrylate or 2-hydroxyethylacrylamide, still more preferably 2-hydroxyethyl acrylate or 2-hydroxyethylacrylamide. The hydroxyl group-containing (meth)acrylate may be optionally present in an amount of about 10 wt % or less based on the total amount of the monomers. The hydroxyl group-containing (meth)acrylate is preferably present in an amount of about 1 wt % to about 5 wt %, more preferably about 1 wt % to about 4 wt %. After reaction with the monomer having a vinyl group within this range, the hydroxyl group-containing (meth)acrylate can minimize change of the adhesive composition over time due to the hydroxyl group after attachment to a substrate by minimizing the amount of the hydroxyl group remaining after reaction with an isocyanate curing agent.

In one embodiment, the urethane(meth)acrylate resin may have a structure represented by Formula 3:

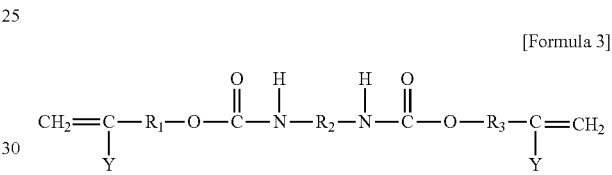

[Formula 3]

(wherein $R_1$, $R_2$ and $R_3$ are each independently a substituted or unsubstituted $C_1$ to $C_{20}$ alkylene, a substituted or unsubstituted $C_5$ to $C_{20}$ cycloalkylene, or a substituted or unsubstituted $C_6$ to $C_{20}$ arylene; and Y is a methyl group or hydrogen).

The urethane(meth)acrylate resin may have a weight average molecular weight of about 3,000 g/mol to 25,000 g/mol. Within this range, the urethane(meth)acrylate resin allows easy polymerization, can minimize reaction time, and provides excellent contraction rate. Preferably, the urethane(meth)acrylate resin has a weight average molecular weight of about 15,000 g/mol to 23,000 g/mol. Within this range, it is possible to obtain flexibility of an adhesive film even with a small amount of a curing agent.

In addition, the urethane(meth)acrylate resin may have a polydispersity index of about 1 to about 3, for example, about 1.2 to about 2, preferably about 1.5 to about 1.9. Within this range of the polydispersity index, the binder has uniform distribution of the molecular weight to exhibit less deviation of production batches, thereby providing excellent reproducibility and uniform properties of final products.

The urethane(meth)acrylate resin may have a glass transition temperature of about −65° C. to about −55° C., and a viscosity at 25° C. of about 5,000 cPs to about 45,000 cPs, preferably about 25,000 cPs to about 44,000 cPs. Within this range of the urethane(meth)acrylate resin, the adhesive composition can have good adhesion and exhibit excellent film formability after photocuring, thereby providing excellent heat resistance.

In other embodiments, the urethane(meth)acrylate resin may be free from the hydroxyl group. In this case, the urethane(meth)acrylate resin reduces viscosity of the binder and can be advantageously applied to large displays.

In this invention, the urethane(meth)acrylate resin may be present in an amount of about 25 wt % to about 76 wt % in the photocurable adhesive composition in terms of solid content. Within this range of the urethane(meth)acrylate resin, the adhesive composition has improved outdoor visibility, high elongation, low tensile strength, and low curing contraction rate. Preferably, the urethane(meth)acrylate resin is present in an amount of about 30 wt % to about 75 wt %, for example, about 35 wt % to about 70 wt %.

(B) Functional Group-Containing Polybutadiene

According to the invention, the functional group-containing polybutadiene may be an epoxy group-containing polybutadiene or a hydroxyl group-containing polybutadiene. The functional group-containing polybutadiene may have a terminal vinyl group.

The urethane(meth)acrylate resin and the functional group-containing polybutadiene may be present in a weight ratio of about 1:1 to about 20:1, preferably about 1:1 to about 15:1. Within this weight ratio range, the adhesive composition can have low contraction rate and exhibit excellent adhesion.

The urethane(meth)acrylate resin and the functional group-containing polybutadiene may be present in an amount of about 50 wt % to about 80 wt % based on the total weight of the adhesive composition. Within this content range, the adhesive composition can have low contraction rate and exhibit excellent adhesion.

(B1) Epoxy Group-Containing Polybutadiene

According to the invention, the epoxy group-containing polybutadiene is a polybutadiene containing epoxy groups at a terminal and in a backbone thereof, controls post-photocuring contraction, and exhibits excellent properties in terms of film formability, thermal and photostability. Preferably, the epoxy group-containing polybutadiene includes a terminal vinyl group to participate in curing, thereby providing excellent storage modulus and contraction rate.

In some embodiments, the epoxy group-containing polybutadiene may have a number average molecular weight of about 3,000 g/mol to about 20,000 g/mol, for example, about 5,000 g/mol to about 10,000 g/mol, preferably about 5,500 g/mol to about 9,500 g/mol. Within this range, the epoxy group-containing polybutadiene can provide good mixing properties upon mixing of an acryl monomer and the urethane acrylate binder.

In the epoxy group-containing polybutadiene, the epoxy group is preferably present in an amount of about 15 wt % to about 25 wt %. Further, the epoxy group-containing polybutadiene may have an epoxy equivalent weight of about 100 g/eq. to about 500 g/eq., preferably about 150 g/eq. to about 300 g/eq., more preferably about 184 g/eq. to about 214 g/eq. Within this range of the epoxy equivalent weight, the adhesive composition can exhibit excellent adhesion and secure suitable viscosity, thereby allowing easy adjustment of final products.

The epoxy group-containing polybutadiene may have a viscosity at 45° C. of about 20,000 cPs to about 120,000 cPs, for example, about 23,000 cPs to about 100,000 cPs, preferably about 25,000 cPs to about 70,000 cPs. Within this range of viscosity, the adhesive composition allows easy adjustment of final products.

The epoxy group-containing polybutadiene has a glass transition temperature of about −70° C. to about −30° C. for example, about −65° C. to about −40° C. Within this range of the glass transition temperature, the adhesive composition exhibits excellent adhesion and can be suitably applied to photocurable adhesive compositions.

In one embodiment, the epoxy group-containing polybutadiene may have repeat units of Formula 1-1 to Formula 1-4:

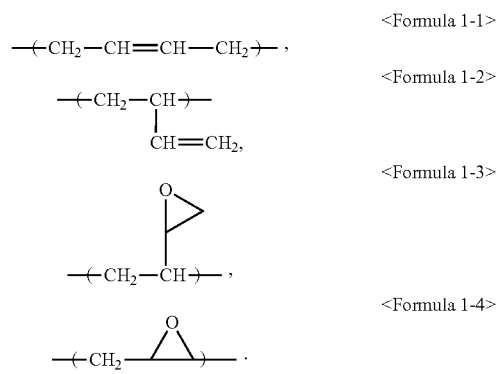

In one embodiment, the epoxy group-containing polybutadiene may have a structure represented by Formula 1:

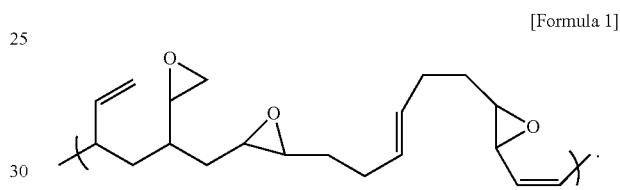

In this invention, the epoxy group-containing polybutadiene may be present in an amount of about 2.5 wt % to about 40 wt % in the photocurable adhesive composition in terms of solid content. Within this range, the adhesive composition exhibits low contraction rate, good adhesion, and excellent property balance. Preferably, the epoxy group-containing polybutadiene is present in an amount of about 5 wt % to about 40 wt % in the photocurable adhesive composition.

(B2) Hydroxyl Group-Containing Polybutadiene

The hydroxyl group-containing polybutadiene is a polybutadiene having a terminal hydroxyl group, and controls post-photocuring contraction, and exhibits excellent properties in terms of film formability, thermal stability and photostability. Preferably, the hydroxyl group-containing polybutadiene has a vinyl group at a terminal or a side chain to participate in curing, thereby providing excellent storage modulus and contraction rate.

In some embodiments, the hydroxyl group-containing polybutadiene may have a weight average molecular weight of about 1,500 g/mol to about 10,000 g/mol, for example, about 3,000 g/mol to about 7,500 g/mol, and a polydispersity index of about 1.2 to about 2.7, for example about, 1.5 to about 2.5. Within this range, the adhesive composition allows an adhesive film to maintain low storage modulus after photocuring.

The hydroxyl group-containing polybutadiene may have a hydroxy value of about 0.7 meq/g to about 1.9 meq/g, for example, about 0.8 meq/g to about 1.5 meq/g. In addition, the hydroxyl group-containing polybutadiene may have a hydroxyl number of about 35 mgKOH/g to about 55 mgKOH/g. Within this range, the hydroxyl group-containing polybutadiene exhibit excellent compatibility with the acryl monomer.

In some embodiments, the hydroxyl group-containing polybutadiene may have a butadiene group content of about 70% or more, preferably about 75% to about 95%. Within this range, the composition exhibits excellent heat resistance.

The hydroxyl group-containing polybutadiene has a glass transition temperature of about −80° C. to about −70° C. Within this range, the composition can maintain low storage modulus, thereby providing good impact characteristics.

In one embodiment, the hydroxyl group-containing polybutadiene has a structure represented by Formula 2:

[Formula 2]

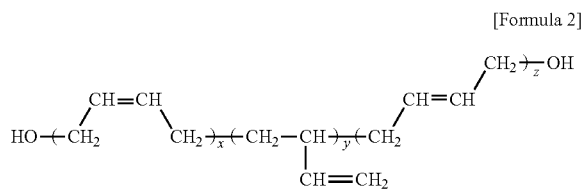

(wherein x ranges from about 0.1 to about 0.35, y ranges from about 0.1 to about 0.35, and z ranges from about 0.4 to about 0.7).

In the present invention, the hydroxyl group-containing polybutadiene may be present in an amount of about 2.5 wt % to about 40 wt %, preferably about 5 wt % to about 30 wt %, in the photocurable adhesive composition in terms of solid content. Within this range, the adhesive composition exhibits low contraction rate, good adhesion, and excellent property balance. More preferably, the hydroxyl group-containing polybutadiene is present in an amount of about 5 wt % to about 25 wt %.

In some embodiments, the urethane(meth)acrylate resin and the hydroxyl group-containing polybutadiene may be presented in an amount of about 50 wt % to about 80 wt % based on the total amount of the adhesive composition. Within this range, the composition can exhibit low storage modulus after photocuring.

(C) Photocurable Monomer

In this invention, the photocurable monomer may be a hydroxyl group-containing vinyl monomer, an alicyclic group-containing vinyl monomer, an alkyl group-containing vinyl monomer, a hetero-alicyclic group-containing (meth)acrylic monomer, a vinyl group and silane group-containing monomer, and the like. In some embodiments, the photocurable monomer may be a hydroxyl group-containing vinyl monomer, a monocyclic or heterocyclic aliphatic ring-containing (meth)acrylate, a (meth)acrylic monomer having a monocyclic aliphatic hetero-ring including nitrogen, oxygen or sulfur, and a vinyl group and silane group-containing monomer. For example, the photocurable monomer may include a $C_2$ to $C_{10}$ alkyl group-containing (meth)acrylate having a hydroxyl group, a $C_{10}$ to $C_{20}$ heterocyclic aliphatic ring-containing (meth)acrylate, a (meth)acrylic monomer having a $C_4$ to $C_6$ monocyclic aliphatic hetero-ring including nitrogen, oxygen or sulfur, and a vinyl group and silane group-containing monomer, without being limited thereto.

The hydroxyl group-containing vinyl monomer is not particularly limited so long as the vinyl monomer has a hydroxyl group and a carbon-carbon double bond. The vinyl monomer may contain at least one hydroxyl group, which may be placed at a terminal or in a structure thereof. In some embodiments, the hydroxyl group-containing vinyl monomer may include a hydroxyl group-containing (meth)acrylate. Examples of the hydroxyl group-containing vinyl monomer may include 2-hydroxyethyl(eth)acrylate, 4-hydroxybutyl(meth)acrylate, 2-hydroxypropyl(meth)acrylate, 2-hydroxybutyl(meth)acrylate, 6-hydroxyhexyl(meth)acrylate, 1,4-cyclohexanedimethanol mono(meth)acrylate, 1-chloro-2-hydroxypropyl(meth)acrylate, diethylene glycol mono(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth)acrylate, 2-hydroxy-3-phenyloxypropyl(meth)acrylate, 4-hydroxycyclohexyl(meth)acrylate, 2-hydroxy-3-phenyloxy(meth)acrylate, 4-hydroxycyclohexyl(meth)acrylate, and cyclohexane dimethanol mono(meth)acrylate, without being limited thereto. These hydroxyl group-containing vinyl monomers may be used alone or in combination thereof. The hydroxyl group-containing monomer may be present in an amount of about 5 wt % to about 30 wt %, or about 1 wt % to about 25 wt %, in the photocurable monomer. Within this content range of the hydroxyl group-containing monomer, the adhesive composition can have a suitable storage modulus after curing.

The alkyl group-containing monomer may include a non-cyclic $C_1$ to $C_{20}$ linear or branched alkyl group-containing (meth)acrylate or a $C_4$ to $C_{20}$ monocyclic or heterocyclic aliphatic ring-containing (meth)acrylate. The alicyclic ring-containing monomer may be an acrylic monomer containing a monocyclic or heterocyclic aliphatic ring including, for example, nitrogen, oxygen or sulfur. Preferably, the alicyclic group-containing monomer includes a $C_6$ to $C_{20}$ heterocyclic aliphatic ring-containing (meth)acrylate and an acrylic monomer containing a $C_4$ to $C_6$ monocyclic aliphatic hetero-ring including nitrogen, oxygen, or sulfur. For example, the alkyl group-containing monomer may include at least one selected from the group consisting of isobornyl(meth)acrylate, acryloyl morpholine, cyclohexyl(meth)acrylate, cyclopentyl(meth)acrylate, methyl methacrylate, ethyl acrylate, styrene, 2-ethylhexyl acrylate, n-butyl acrylate, methyl(meth)acrylate, ethyl(meth)acrylate, propyl(meth)acrylate, n-butyl(meth)acrylate, t-butyl(meth)acrylate, isobutyl(meth)acrylate, pentyl(meth)acrylate, hexyl(meth)acrylate, heptyl(meth)acrylate, octyl(meth)acrylate, nonyl(meth)acrylate, decyl(meth)acrylate, and lauryl(meth)acrylate, without being limited thereto. The alkyl group-containing monomer may be present in an amount of about 40 wt % to about 75 wt %, or about 45 wt % to about 70 wt %, in the photocurable monomer. Within this range of the photocurable monomer, the adhesive composition allows easy operation upon coating and provides low contraction rate upon curing.

Preferably, the alkyl group-containing monomer includes an alicyclic ring-containing (meth)acrylate and an alicyclic hetero-ring containing (meth)acrylate. In some embodiments, the alicyclic group containing (meth)acrylate and the alicyclic hetero-ring containing (meth)acrylate may be present in a weight ratio of about 1:1 to about 10:1, preferably about 3:1 to about 8:1, in the alkyl group-containing monomer.

The vinyl group and silane group-containing monomer exhibits adhesion to glass. For example, the vinyl group and silane group-containing monomer include a monomer represented by (R1)(R2)(R3)Si—(CH2)n-COO—CH═CH2 (where R1, R2 and R3 are each independently hydrogen, halogen, a $C_1$ to $C_{10}$ alkyl group or a $C_1$ to $C_{10}$ alkoxy group; and n is 0 to 10). For example, the vinyl group and silane group-containing monomer may include at least one selected from the group consisting of vinyltrichlorosilane, vinyltrimethoxysilane, vinylmethyldimethoxysilane, and vinyltriethoxysilane, without being limited thereto. The vinyl group and silane group-containing monomer may be present in an amount of about 5 wt % to about 30 wt %, or about 7 wt % to about 20 wt %. Within this range, the adhesive composition allows easy operation upon coating and provides low contraction.

The photocurable monomer may be present in an amount of about 15 wt % to about 40 wt % in the photocurable adhesive composition. Within this content range of the photocurable monomer, the photocurable adhesive composition allows efficient photocuring and easy adjustment of viscosity thereof. In some embodiments, the photocurable monomer may be present in an amount of about 20 wt % to about 38 wt % in the photocurable adhesive composition.

(D) Photoinitiator

The photoinitiator may include at least one selected from the group consisting of benzophenone, acetophenone, triazine, thioxanthone, benzoin or oxime compounds, without being limited thereto. For example, the photoinitiator may be selected from among benzophenone, 4-phenyl benzophenone, hydroxy benzophenone, acrylated benzophenone, 4,4'-bis(dimethylamino)benzophenone, 4,4'-bis(diethylamino) benzophenone, 4,4'-bis(dimethylamino)benzophenone, 2,2'-diethoxyacetophenone, 2,2'-dibutoxyacetophenone, 2-hydroxy-2-methylpropiophenone, 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, thioxanthone, 2-methylthioxanthone, benzoin, benzoin methyl ether, and the like.

The photoinitiator may be present in an amount of about 1 wt % to about 5 wt % in the photocurable adhesive composition. Within this content range, the photoinitiator allows efficient photocuring without increasing viscosity of the photocurable material. Preferably, the photoinitiator may be present in an amount of about 1.5 wt % to about 4.5 wt %.

(E) Additives

According to the invention, the photocurable adhesive composition may further include silane coupling agents, UV absorbents, heat stabilizers, and the like. The photocurable adhesive composition may include at least one type of additive.

The UV absorbent serves to improve photo-stability of the adhesive composition. The UV absorbent may include at least one selected from the group consisting of benzotriazole, benzophenone and triazine compounds, without being limited thereto. For example, the UV absorbent may be selected from among 2-(benzotriazol-2-yl)-4-(2,4,4-trimethylpentane-2-yl)phenol, 2-(2'-hydroxy-5'-methylphenyl)benzotriazol, 2-[2'-hydroxy-3',5'-bis(α,α-dimethylbenzyl)phenyl]benzotriazole, 2-(2'-hydroxy-3',5'-di-t-butylphenyl)benzotriazole, 2,4-hydroxybenzophenone, 2,4-hydroxy-4-methoxybenzophenone, 2,4-hydroxy-4-methoxybenzophenone-5-sulfonic acid, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, and the like. The UV absorbent may be present in an amount of about 0.1 wt % to about 1 wt % in the photocurable adhesive composition. Within this content range, the UV absorbent can prevent curing of the adhesive composition by weak UV light, thereby improving storage stability of the photocurable material.

The heat stabilizer serves to enhance thermal stability of the adhesive composition by preventing oxidation of the adhesive composition. The heat stabilizer may include phenol compounds, quinone compounds, amine compounds, and phosphite compounds, without being limited thereto. For example, the heat stabilizer may be selected from among tetrakis[methylene(3,5-di-t-butyl-4-hydroxyhydrocinnamate)]methane, tris(2,4-di-t-butylphenyl)phosphite, and the like. The heat stabilizer may be present in an amount of about 0.1 wt % to about 1 wt % in the photocurable adhesive composition. Within this range, the heat stabilizer prevents deformation of the adhesive composition by heat, thereby improving storage stability of the composition.

The photocurable adhesive composition may further include the silane coupling agent to enhance adhesion to glass. As the silane coupling agent, a typical silane coupling agent, for example, a vinyl group or mercapto group-containing silane coupling agent, may be used. For example, the silane coupling agent may include at least one selected from the group consisting of polymerizable fluorine group-containing silicon compounds, such as 3-methacryloxypropyltrimethoxysilane, trimethoxysilane, vinyltriethoxysilane, and the like; silicon compounds having an epoxy structure, such as 3-glycidoxypropyltrimethoxysilane, 3-glycidoxypropylmethyldimethoxysilane, 2-(3,4-peoxycyclohexyl)ethyltrimethoxsilane, and the like; amino group containing silicon compounds, such as 3-aminopropyltrimethoxysilane, N-(2-aminoethyl)-3-aminopropyltrimethoxysilane, N-(2-aminoethyl)-3-aminopropylmethyldimethoxysilane, and the like; and 3-chloropropyltrimethoxysilane, and the like, without being limited thereto. The silane coupling agent may be present in an amount of about 1 wt % to about 5 wt %, preferably about 1 wt % to about 3 wt % in the adhesive composition. Within this range, the silane coupling agent can improve adhesion of the adhesive composition to a glass substrate and provide further improved adhesion even after a predetermined period of time, thereby maintaining high adhesion of final products.

The photocurable adhesive composition may further include aromatic (meth)acrylates, epoxy acrylates, polyester acrylates, and acryl acrylate oligomers. These monomers and oligomers must have excellent compatibility with a butadiene rubber binder, and can allow adjustment of viscosity at 25° C. while improving adhesion. In addition, these monomers and oligomers may have a number average molecular weight of about 100 g/mol to about 5000 g/mol, and may be optionally present in an amount of about 20 wt % or less in the photocurable adhesive composition. Within this content range of the monomers and oligomers, the photocurable adhesive composition allows easy adjustment of viscosity while improving adhesion to glass. In addition, the adhesive composition suffers from less contraction after photocuring.

Examples of the aromatic (meth)acrylate may include methacrylic acid, such as 2-ethylphenoxy(meth)acrylate, 2-ethylthiophenyl(meth)acrylate, phenyl(meth)acrylate, benzyl(meth)acrylate, 2-phenylethyl(meth)acrylate, 3-phenylpropyl(meth)acrylate, 4-phenylbutyl(meth)acrylate, 2-2-methylphenylethyl(meth)acrylate, 2-3-methylphenylethyl(meth)acrylate, 2-4-methylphenylethyl(meth)acrylate, 2-(4-propylphenyl)ethyl(meth)acrylate, 2-(4-(1-methylethyl)phenyl)ethyl(meth)acrylate, 2-(4-methoxyphenyl)ethyl(meth)acrylate, 2-(4-cyclohexylphenyl)ethyl(meth)acrylate, 2-(2-chlorophenyl)ethyl(meth)acrylate, 2-(3-chlorophenyl)ethyl(meth)acrylate, 2-(4-chlorophenyl)ethyl(meth)acrylate, 2-(4-boromophenyl)ethyl(meth)acrylate, 2-(3-phenylphenyl)ethyl(meth)acrylate, and 2-(4-benzylphenyl)ethyl(meth)acrylate, without being limited thereto. These may be used alone or in combination thereof. Particularly, benzyl methacrylate or benzyl acrylate may be used.

According to the present invention, the photocurable adhesive composition has a curing contraction rate of about 3.5% or less, preferably about 0.1% to about 2.5%. The curing contraction rate may be calculated by "(specific gravity of liquid composition before curing−specific gravity of solid composition after curing)/specific gravity of liquid composition before curing×100".

In addition, the photocurable adhesive composition of the present invention may have a pH of about 4 or higher, for example, about 4 to about 8, preferably about 4.5 to about 7. As such, since the adhesive composition has a pH of about 4 or higher, the adhesive composition can minimize corrosion of substrates.

In other embodiments, the photocurable adhesive composition has an elongation of about 200% to about 800% in accordance with ASTM D412. According to the first embodiment, the adhesive composition has an elongation of about 300% to about 600% in accordance with ASTM D412. According to the second embodiment, the adhesive composition has an elongation of about 230% to about 400% in accordance with ASTM D412.

Further, the photocurable adhesive composition may have a storage modulus of about 10 kPa to about 100 kPa. According to the first embodiment, the adhesive composition may have a storage modulus of about 30 kPa to about 75 kPa, for example, about 32 kPa to about 70 kPa. According to the second embodiment, the adhesive composition may have a storage modulus of about 10 kPa to about 50 kPa, for example, about 15 kPa to about 29 kPa. As used herein, storage modulus is measured by irradiating an adhesive composition at 2000 mJ/cm$^2$ to prepare a specimen having a thickness of about 500 μm and a diameter of 25 mm, followed by measuring storage modulus using an ARES-G2 (TA Instrument Inc.) at a frequency of 1 rad/s while increasing temperature from 25° C. to 100° C. at a rate of 10° C./min.

The photocurable adhesive composition according to the invention may be advantageously applied to liquid adhesives for optical films or substrates of displays. Particularly, the photocurable adhesive composition according to the present invention may be usefully applied to adhesion between a cover window and an ITO substrate.

Next, the present invention will be described with reference to some examples. It should be understood that the following examples are provided for illustration only and are not to be construed in any way as limiting the present invention.

MODE FOR INVENTION

Examples

Details of components used in the following examples and comparative examples were as follows.

(A) Urethane(meth)acrylate resin: A binder (HA-800, Cheil Industries Inc.) having a weight average molecular weight of 20,000 g/mol, a polydispersity index of 1.8, Tg of −60° C., and a viscosity at 25° C. of 43,000 cPs was used.

(B) Functional group-containing polybutadiene (B1) Epoxy group-containing polybutadiene: EPOLEAD PB3600 (Daicel Corporation) having a number average molecular weight of 5900 g/mol, Tg of −50° C., an epoxy equivalent weight of 184 g/eq. to 213 g/eq., a viscosity at 45° C. of about 20,000 cPs to about 70,000 cPs was used.

(B2) Hydroxyl group-containing polybutadiene: Polybutadiene 45HTLO (Idemitsu Kosan Co., Ltd) having a weight average molecular weight of 7,000 g/mol, a polydispersity index of 2.5, a hydroxyl number of 47 mgKOH/g, a hydroxy value of 0.84 meq/g, and Tg of −75° C. was used.

(C') Acrylic acid: LG Chem Co., Ltd., a purity of 99% or higher, and a water content of 0.3% or less (C) Photocurable monomer: A mixture of 20 wt % 2-hydroxyethyl acrylate (LG Chem Co., Ltd.), 10 wt % 3-methacryloxypropyltrimethoxysilane (KBM-503, Shin-Etsu Silicon), 60 wt % isobornyl acrylate (Osaka Organic Chemical Industry Ltd.), and 10 wt % acryl morpholine (Kojin) 10 wt % was used.

(D) Photoinitiator: 1-hydroxy-cyclohexyl-phenyl-ketone (IC-184 BASF) was used.

(E1) UV absorbent: 3-(2H-Benzotriazolyl)-5-(1,1-dimethylethyl)-4-hydroxy-benzenepropanoic acid octyl ester (Tinuvin 384, BASF) was used.

(E21) Heat stabilizer: 2-methyl-4,6-bis(octylthio)methyl-2,4-bis(octylthiomethyl)-6-methylphenol2-methyl-4,6-bis ((octylthio)methyl) phenol2-methyl-4,6-[(octylthio)methyl] phenol (Antioxidant 1520, BASF) was used.

(E22) Heat stabilizer: Tetrakis[methylene(3,5-di-t-butyl-4-hydroxyhydrocinnamate)]methane (Antioxidant 1010, BASF) was used.

<Property Measurement>

1. Curing contraction rate (%): A specific gravity of a liquid composition before photocuring and a specific gravity of a solid composition after curing were measured using a digital gravimeter DME-220E (Shinko, Japan) to calculate contraction rate. The contraction rate may be calculated by "(specific gravity of liquid composition before curing−specific gravity of solid composition after curing)/specific gravity of liquid composition before curing×100".

2. Adhesive strength (kgf): With each of the adhesive films prepared in Examples and Comparative Examples placed between glass plates, adhesive strength of the adhesive film was measured by the same method as in measurement of die shear strength. With an adhesive strength tester Dage series 4000PXY, peel force was measured while laterally pushing an upper glass plate at a force of 200 kgf at 25° C. A lower glass plate had a size of 2 cm×2 cm×1 mm, the upper glass plate had a size of 1.5 cm×1.5 cm×1 mm, and the adhesive film had a thickness of 500 μm.

3. Tensile strength and elongation: Specimens were prepared and evaluation was performed in accordance with ASTM D412. Onto a polyethylene terephthalate release film, an adhesive composition was coated to a thickness of 500 μm and cured at 6000 mJ/cm$^2$, followed by measuring elongation (%) as a stretched distance of the specimen at breakage using Instron series IX/s Automated materials Tester-3343. At the same time, tensile strength (gf/mm$^2$) was also measured.

4. Index of refraction: A test film was prepared by coating an adhesive composition onto a polyethylene terephthalate release film to a thickness of 200 μm, followed by curing at 6000 mJ/cm$^2$. The index of refraction was measured using an ABBE5 (Bellingham/Stanley Ltd.) in accordance with ASTM D1218.

5. Transmittance of visible light (%): Transmittance of visible light was measured on a 200 μm thick adhesive film using a Lambda 950 (Perkin Elmer) at a wavelength of 550 nm.

6. Post-curing appearance: Each of adhesive films prepared in Examples and Comparative Examples was placed on a white paper sheet to observe sticky and outer appearance through the naked eye.

7. Storage modulus (Kpa): The adhesive composition was illuminated at 2000 mJ/cm$^2$ to prepare a specimen having a thickness of about 500 μm and a diameter of 25 mm, followed by measuring storage modulus using an ARES-G2 (TA Instrument Inc.) at a frequency of 1 rad/s while increasing temperature from 25° C. to 100° C. at a rate of 10° C./min.

8. Liquid spreading: 1 g of the adhesive composition was dropped at a height of 1 cm onto a glass plate having a size of 10 cm×10 cm×1 mm at about 25° C., followed by measuring a degree of liquid spreading based on change in area.

9. pH: 10 g of the adhesive composition was dissolved in 100 g of methylethylketone as an organic solvent, and left until pH was not changed, followed by measuring pH using a pH meter (Mettler Toledo Inlab Routine Pro).

First Embodiment

Examples 1 to 4 and Comparative Examples 1 to 5

Under a UV blocking lamp, the components were placed in amounts as listed in the following Table 1, and stirred at 400 rpm and 25° C. for 90 minutes. After stirring, the adhesive composition was filtered through a 200 mesh filter and left at 25° C. for 48 hours. After leaving the composition for 1 day, bubbles were completely removed from the adhesive composition, which in turn was coated onto a polyethylene terephthalate release film to a thickness of 200 μm and a thickness of 500 μm using a coating bar, followed by curing the adhesive composition at 2000 mJ/cm² to prepare adhesive films. After curing, the 200 μm thick adhesive film was evaluated as to optical properties such as light transmittance and the like, and the 500 μm thick adhesive film was evaluated as to mechanical properties such as elongation and the like. Results are shown in Table 2.

TABLE 1

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| (A) | 30 | 40 | 60 | 70 | 40 | — | 90 | — | 30 |
| (B1) | 30 | 40 | 15 | 5 | — | 40 | — | 90 | 30 |
| (C') | — | — | — | — | — | — | — | — | 5 |
| (C) | 35 | 15 | 20 | 20 | 55 | 55 | 5 | 5 | 30 |
| (D) | 4 | 4 | 4 | 4 | 4 | 4 | 4 | 4 | 4 |
| (E1) | 0.5 | 0.5 | 0.5 | 0.5 | 0.5 | 0.5 | 0.5 | 0.5 | 0.5 |
| (E21) | 0.5 | 0.5 | 0.5 | 0.5 | 0.5 | 0.5 | 0.5 | 0.5 | 0.5 |

(Unit: wt %)

As shown in Table 2, the adhesive film of Comparative Example 4 exhibited deterioration in film formability after photocuring, thereby causing surface residues. In addition, the adhesive film of Comparative Example 3 exhibited deteriorated impact strength. The adhesive films of Comparative Examples 1 and 2 exhibited significant increase in contraction after photocuring. The adhesive film of Comparative Example prepared using acrylic acid exhibited low reworkability and had a pH of less than 4. On the contrary, it can be seen that the adhesive composition according to the present invention exhibited low contraction rate and high outdoor visibility, had excellent properties in terms of adhesion, tensile strength, elongation, outer appearance and storage modulus, and a pH of about 4 or higher.

Second Embodiment

Examples 5 to 10 and Comparative Examples 6 to 11

Under a UV blocking lamp, the components were placed in amounts as listed in the following Table 3, and stirred at 400 rpm and 25° C. for 90 minutes. After stirring, the adhesive composition was filtered through a 200 mesh filter and left at 25° C. for 48 hours. After leaving the composition for 2 days, bubbles were completely removed from the adhesive composition, which in turn was coated onto a polyethylene terephthalate release film to a thickness of 200 μm and a thickness of 500 μm using a coating bar, followed by curing the adhesive composition at 2000 mJ/cm² to prepare adhesive films. After curing, the 200 μm thick adhesive film was evaluated as to optical properties such as light transmittance and the like, and the 500 μm thick adhesive film was evaluated as to mechanical properties such as elongation and the like. Results are shown in Tables 4 and 5.

TABLE 2

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| Curing contraction rate (%) | 3.5 | 2.4 | 2.8 | 3.0 | 5.4 | 4.8 | 1.9 | 0.3 | 3.5 |
| Adhesive strength (kgf) | 60 | 65 | 55 | 48 | 34 | 25 | 38 | 5 | 86 |
| Tensile strength | 25 | 39 | 45 | 39 | 15 | 8 | 125 | 0.2 | 34 |
| Elongation (%) | 350 | 450 | 480 | 520 | 230 | 120 | 620 | 30 | 320 |
| Index of refraction | 1.49 | 1.50 | 1.47 | 1.47 | 1.47 | 1.49 | 1.47 | 1.51 | 1.49 |
| Visible light transmittance (%) | 94.1 | 94.3 | 93.6 | 94.4 | 94.2 | 93.7 | 94.9 | 93.1 | 94.1 |
| Post-curing appearance | Good | Good | Good | Good | Good | Poor | Good | Poor | Good |
| Storage modulus (Pa) | 32000 | 55000 | 63000 | 67000 | 12000 | 7000 | 84000 | 78000 | 43000 |
| Liquid spreading | Good | Good | Good | Good | Good | Good | Poor | Poor | Good |
| pH | 4.9 | 5.2 | 5.1 | 5.1 | 4.6 | 4.5 | 5.4 | 5.4 | 3.2 |

TABLE 3

| Component | Example | | | | | | Comparative Example | | | | | |
| --- | --- | --- | --- | --- | --- | --- | --- | --- | --- | --- | --- | --- |
| | 5 | 6 | 7 | 8 | 9 | 10 | 6 | 7 | 8 | 9 | 10 | 11 |
| (A) | 40 | 49 | 60 | 50 | 65 | 75 | 40 | 95 | — | — | 40 | 40 |
| (B2) | 17 | 21 | 20 | 5 | 5 | 5 | — | — | 40 | 95 | 17 | 17 |
| (C') | — | — | — | — | — | — | — | — | — | — | 1 | 5 |
| (C) | 38 | 25 | 15 | 40 | 25 | 15 | 55 | — | 55 | — | 37 | 33 |
| (D) | 4 | 4 | 4 | 4 | 4 | 4 | 4 | 4 | 4 | 4 | 4 | 4 |
| (E1) | 0.5 | 0.5 | 0.5 | 0.5 | 0.5 | 0.5 | 0.5 | 0.5 | 0.5 | 0.5 | 0.5 | 0.5 |
| (E22) | 0.5 | 0.5 | 0.5 | 0.5 | 0.5 | 0.5 | 0.5 | 0.5 | 0.5 | 0.5 | 0.5 | 0.5 |

(Unit: wt %)

TABLE 4

| | Example | | | | | |
| --- | --- | --- | --- | --- | --- | --- |
| | 5 | 6 | 7 | 8 | 9 | 10 |
| Curing contraction rate (%) | 2.17 | 1.93 | 1.84 | 2.34 | 2.10 | 1.86 |
| Adhesive strength (kgf) | 28 | 36 | 43 | 33 | 37 | 41 |
| Tensile strength | 18 | 21 | 25 | 22 | 33 | 37 |
| Elongation (%) | 250 | 320 | 350 | 270 | 260 | 230 |
| Index of refraction | 1.48 | 1.48 | 1.48 | 1.48 | 1.48 | 1.48 |
| Visible light transmittance (%) | 99.2 | 99.3 | 99.1 | 99.2 | 99.2 | 99.1 |
| Post-curing appearance | Good | Good | Good | Good | Good | Good |
| Storage modulus (Pa) | 20400 | 22000 | 24800 | 19200 | 23200 | 28800 |
| Liquid spreading | Good | Good | Good | Good | Good | Good |
| pH | 4.8 | 5.2 | 5.3 | 4.6 | 5.2 | 5.3 |

TABLE 5

| | Comparative Example | | | | | |
| --- | --- | --- | --- | --- | --- | --- |
| | 6 | 7 | 8 | 9 | 10 | 11 |
| Curing contraction rate (%) | 3.87 | 1.75 | 3.11 | — | 2.17 | 2.23 |
| Adhesive strength (kgf) | 25 | 53 | 18 | — | 34 | 58 |
| Tensile strength | 16 | 70 | 8 | — | 23 | 43 |
| Elongation (%) | 210 | 170 | 160 | — | 250 | 220 |
| Index of refraction | 1.47 | 1.47 | 1.48 | — | 1.48 | 1.48 |
| Visible light transmittance (%) | 99.1 | 99.3 | 99.1 | — | 99.2 | 99.2 |
| Post-curing appearance | Good | Good | Surface residues | Surface residues | Good | Good |
| Storage modulus (Pa) | 12800 | 52000 | 6000 | 8800 | 20130 | 38300 |
| Liquid spreading | Good | Poor | Good | Poor | Good | Good |
| pH | 4.3 | 5.7 | 4.3 | 5.7 | 3.7 | 3.2 |

As shown in Tables 4 and 5, when the functional group-containing polybutadiene was not used, the adhesive film composition exhibited deterioration in impact strength. In addition, when the urethane(meth)acrylate resin was not used, the adhesive film provided surface residues due to deterioration in film formability after photocuring. On the contrary, it can be seen that the adhesive composition according to the present invention exhibited low contraction rate and high outdoor visibility, had excellent properties in terms of adhesion, tensile strength, elongation, outer appearance and storage modulus, and a pH of about 4 or higher.

Although some embodiments have been described herein, it will be understood by those skilled in the art that these embodiments are provided for illustration only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A photocurable adhesive composition comprising a urethane (meth)acrylate resin, a functional group-containing polybutadiene, a photocurable monomer, and a photoinitiator, wherein:
   the functional group is an epoxy group or a hydroxyl group,
   the composition has a pH of more than 4, and
   the urethane (meth)acrylate resin is free from a hydroxyl group.

2. The photocurable adhesive composition according to claim 1, wherein the photocurable adhesive composition provides a curing contraction rate of about 3.5% or less and an elongation of about 200% to about 800% in accordance with ASTM D638.

3. The photocurable adhesive composition according to claim 1, wherein the urethane (meth)acrylate resin and the functional group-containing polybutadiene are present in a combined amount of about 50 wt % to about 80 wt % based on a total weight of the adhesive composition.

4. The photocurable adhesive composition according to claim 1, wherein each of the urethane (meth)acrylate resin and the functional group-containing polybutadiene contains a terminal vinyl group.

5. The photocurable adhesive composition according to claim 1, comprising: about 25 wt % to about 76 wt % of the urethane (meth)acrylate resin, about 2.5 to about 40 wt % of the functional group-containing polybutadiene, about 15 wt % to about 40 wt % of the photocurable monomer, and about 1 wt % to about 5 wt % of the photoinitiator.

6. The photocurable adhesive composition according to claim 1, wherein the urethane (meth)acrylate resin and the functional group-containing polybutadiene are present in a urethane (meth)acrylate resin:functional group-containing polybutadiene weight ratio of about 1:1 to about 20:1.

7. The photocurable adhesive composition according to claim 1, wherein the urethane (meth)acrylate resin has a weight average molecular weight of about 3,000 g/mol to about 25,000 g/mol and a polydispersity index of about 1 to about 3.

8. The photocurable adhesive composition according to claim 1, wherein the urethane (meth)acrylate resin has a glass transition temperature of about −65° C. to about −55° C. and a viscosity at 25° C. of about 5,000 cPs to about 45,000 cPs.

9. The photocurable adhesive composition according to claim 1, wherein the photocurable adhesive composition provides a storage modulus of about 10 kPa to about 100 kPa.

10. The photocurable adhesive composition according to claim 1, wherein the functional group-containing polybutadiene is an epoxy group-containing polybutadiene.

11. The photocurable adhesive composition according to claim 10, wherein the epoxy group-containing polybutadiene has a number average molecular weight of about 3,000 g/mol to about 20,000 g/mol and a viscosity at 45° C. of about 20,000 cPs to about 120,000 cPs.

12. The photocurable adhesive composition according to claim 10, wherein the epoxy group-containing polybutadiene has an epoxy equivalent weight of about 100 g/eq. to about 500 g/eq.

13. The photocurable adhesive composition according to claim 10, wherein the epoxy group-containing polybutadiene has a glass transition temperature of about −70° C. to about −30° C.

14. The photocurable adhesive composition according to claim 11, wherein the epoxy group-containing polybutadiene has a repeat unit represented by one or more of Formula 1-1 to Formula 1-4:

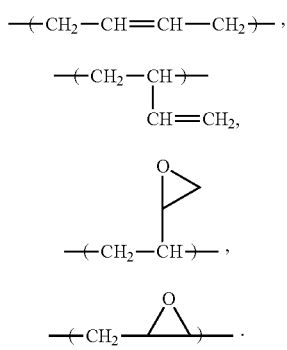

<Formula 1-1>
<Formula 1-2>
<Formula 1-3>
<Formula 1-4>

15. The photocurable adhesive composition according to claim 1, wherein the functional group-containing polybutadiene is a hydroxyl group-containing polybutadiene.

16. The photocurable adhesive composition according to claim 15, wherein the hydroxyl group-containing polybutadiene has a weight average molecular weight of about 1,500 g/mol to about 10,000 g/mol and a polydispersity index of about 1.2 to about 2.7.

17. The photocurable adhesive composition according to claim 15, wherein the hydroxyl group-containing polybutadiene has a hydroxy value of about 0.7 meq/g to about 1.9 meq/g and a butadiene group content of 70% or more.

18. The photocurable adhesive composition according to claim 15, wherein the hydroxyl group-containing polybutadiene has a glass transition temperature of about −80° C. to about −70° C.

19. The photocurable adhesive composition according to claim 15, wherein the hydroxyl group-containing polybutadiene has a structure represented by Formula 2:

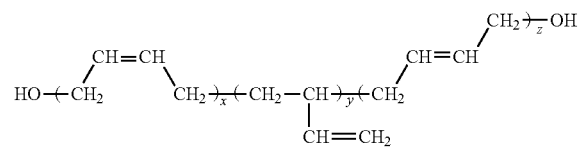

(where x ranges from about 0.1 to about 0.35, y ranges from about 0.1 to about 0.35, and z ranges from about 0.4 to about 0.7).

20. The photocurable adhesive composition according to claim 1, wherein the photocurable monomer comprises at least one selected from the group consisting of a hydroxyl group-containing (meth)acrylate, a monocyclic or heterocyclic aliphatic ring-containing (meth)acrylate, a (meth)acrylic monomer having a monocyclic aliphatic hetero-ring including nitrogen, oxygen or sulfur, a carboxyl group-containing (meth)acrylic monomer, and a vinyl group and silane group-containing monomer.

21. The photocurable adhesive composition according to claim 1, further comprising: one or more of a silane coupling agent, a UV absorbent, or a heat stabilizer.

22. A display comprising the photocurable adhesive composition according to claim 1.

23. The display according to claim 22, wherein the photocurable adhesive composition forms an adhesive film interposed between and in contact with a cover window and an ITO substrate.

* * * * *